May 22, 1951      E. G. STAUDE      2,553,795
ELECTRIC POWER ASSISTOR
Filed July 29, 1948      4 Sheets-Sheet 1
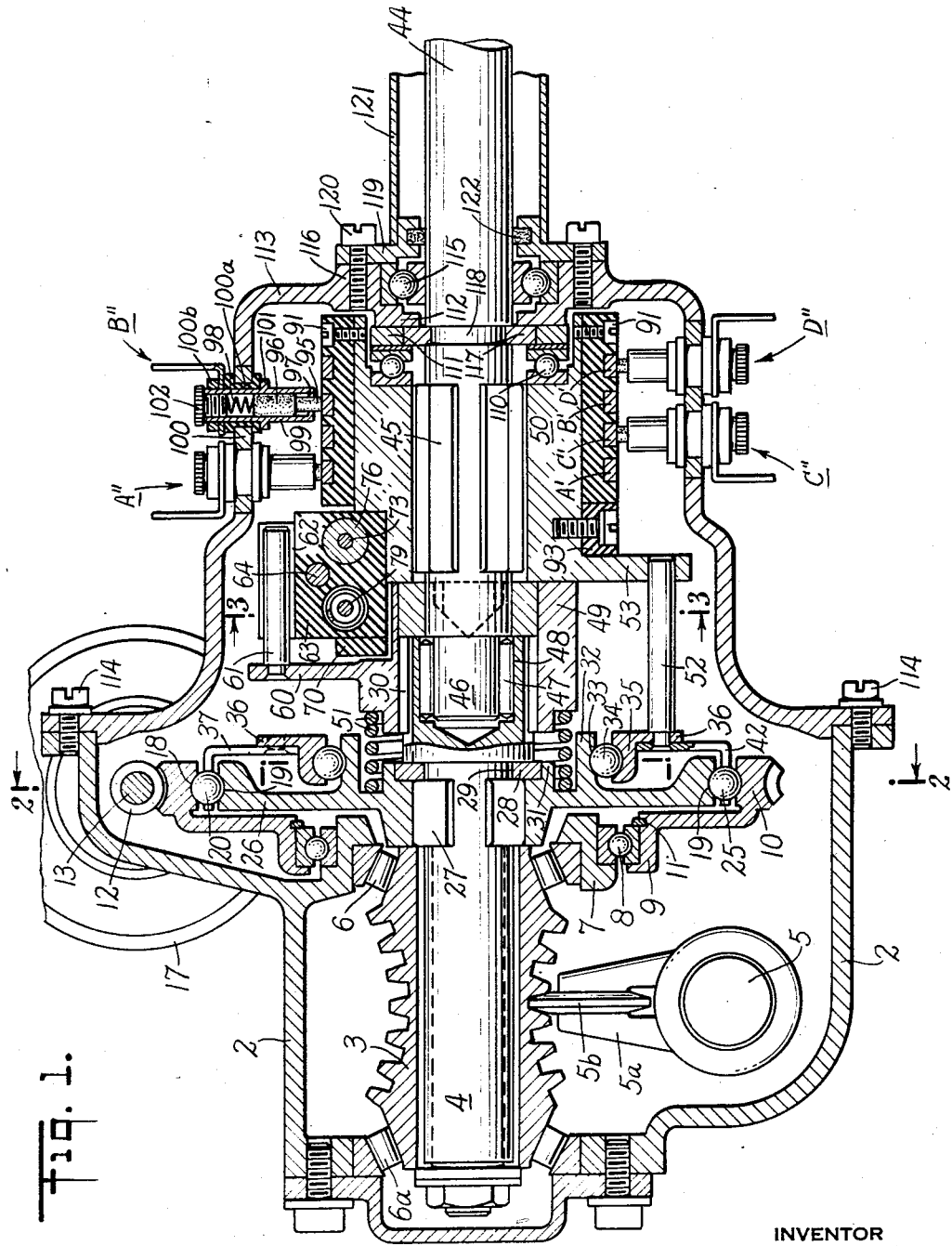
INVENTOR
Edwin G. Staude
BY
Arthur Wright
ATTORNEY

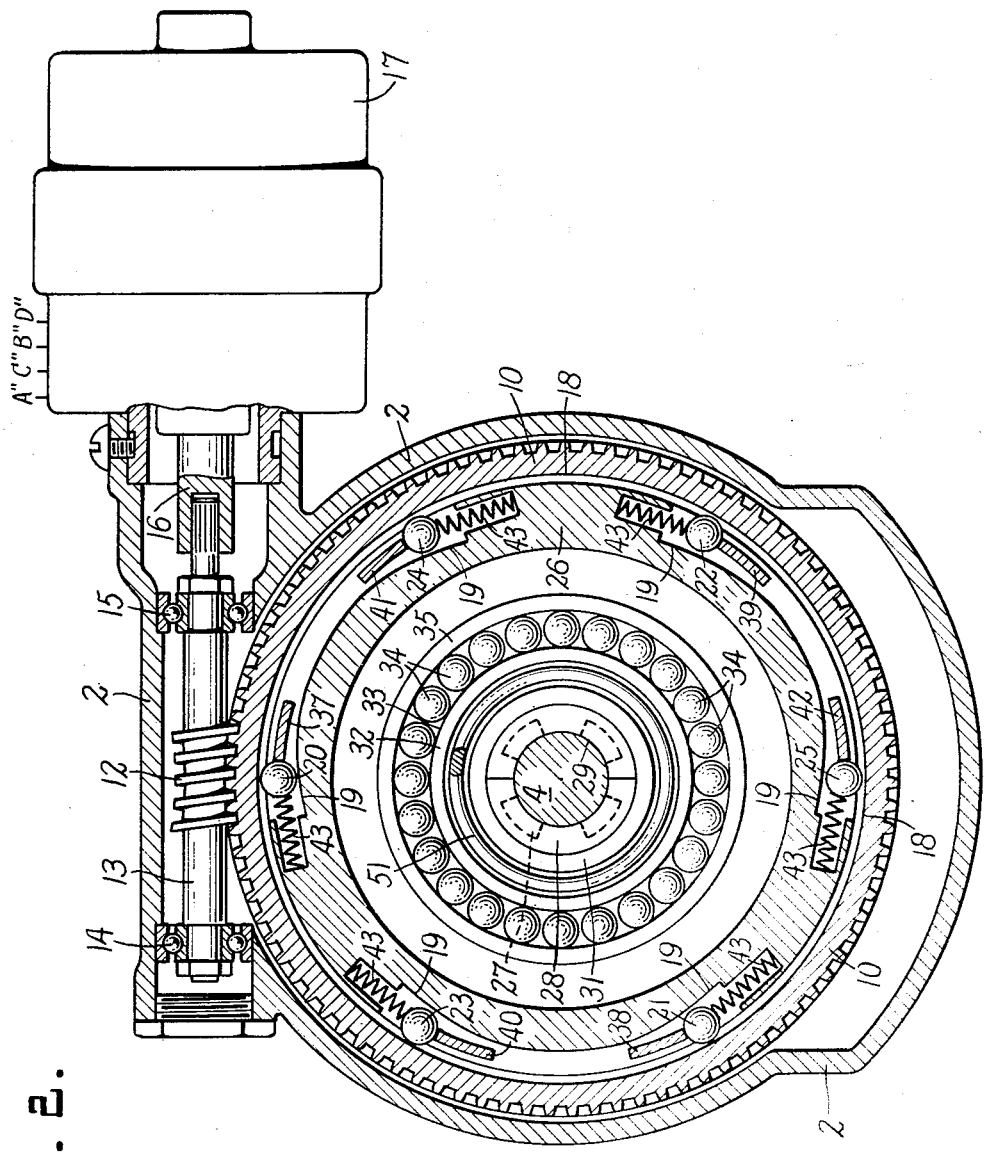

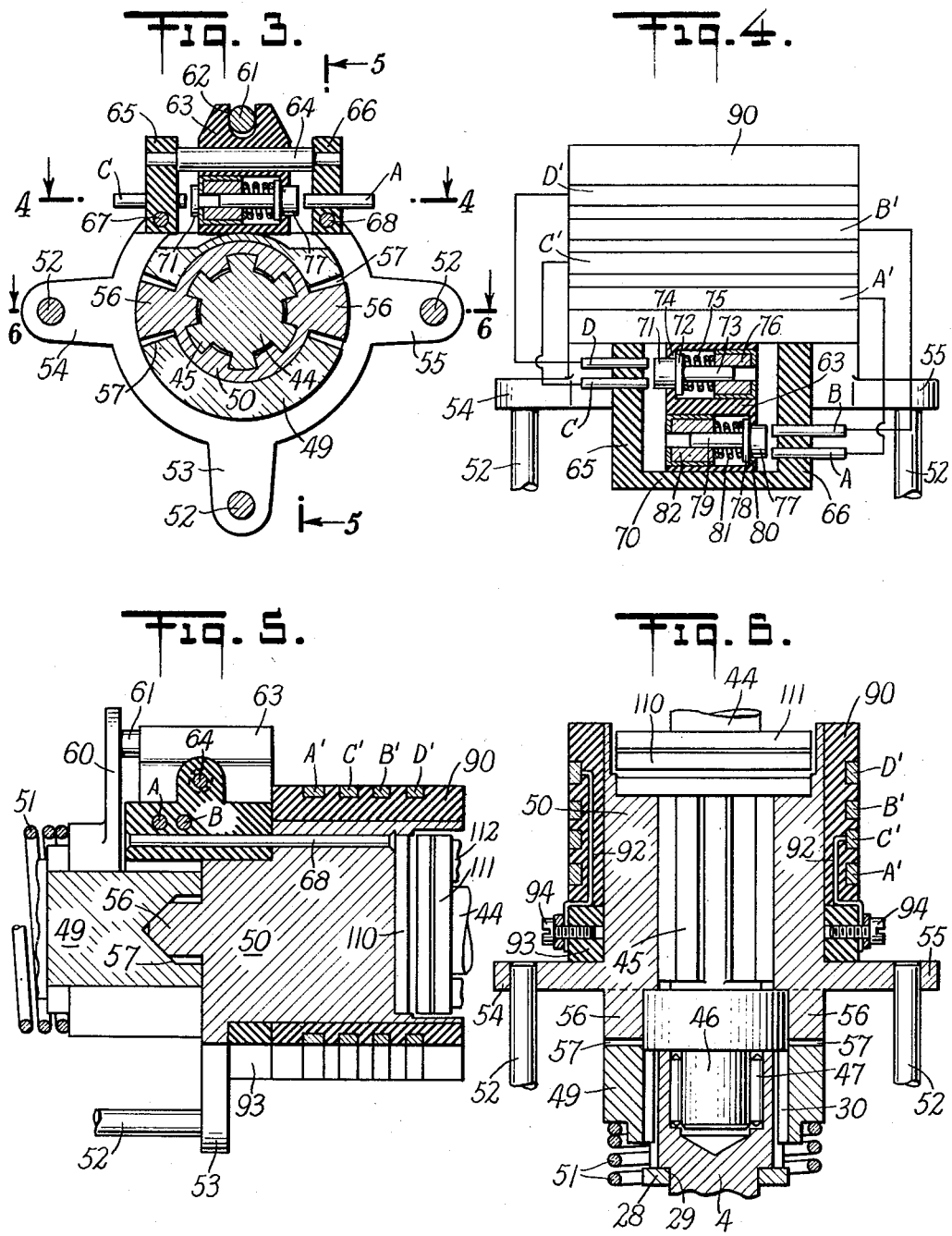

May 22, 1951  E. G. STAUDE  2,553,795
ELECTRIC POWER ASSISTOR
Filed July 29, 1948  4 Sheets—Sheet 4
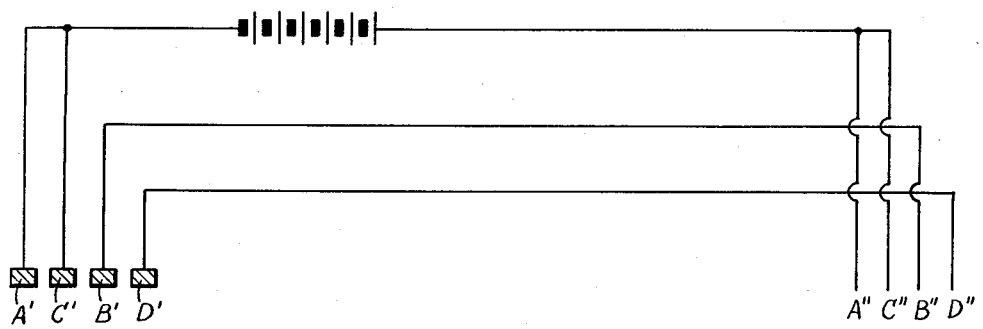
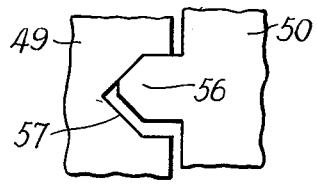 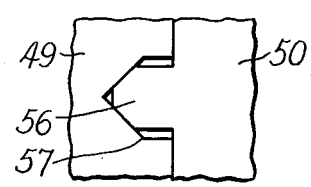 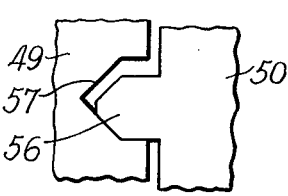
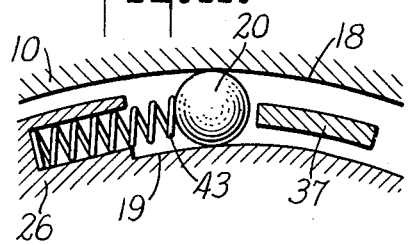 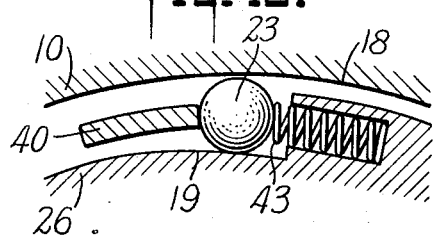
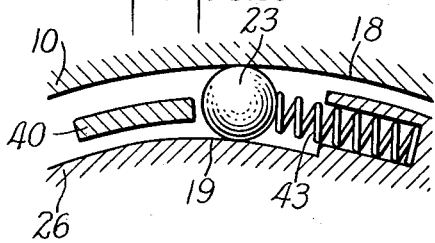 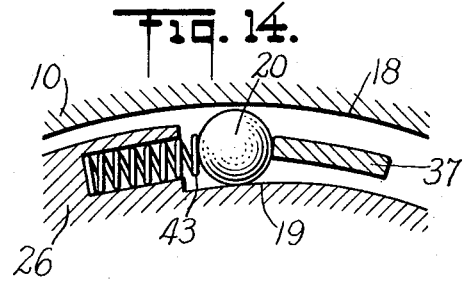
INVENTOR
Edwin G. Staude
BY
Arthur Wright
ATTORNEY Patented May 22, 1951

2,553,795

UNITED STATES PATENT OFFICE 2,553,795

ELECTRIC POWER ASSISTOR

Edwin G. Staude, Minneapolis, Minn.

Application July 29, 1948, Serial No. 41,287

16 Claims. (Cl. 74—388)

My invention relates to apparatus for applying power generally, as for steering shafts in motor cars, trucks, busses or other vehicles, and which may be constructed so that it operates when required while at other times being inactive without influence on the position of the steering wheel shaft.

In carrying out my invention, I may use an electric battery or other source of power, so that my device is not necessarily dependent on engine speeds for the operation of pumps, which require to be governor-controlled because of variable engine speeds and variable power demand. In my device, because of its high efficiency, only a minimum of power from a battery current is required.

My invention is an improvement, therefore, over previous devices that use air, vacuum or liquid pressure, all of which must be displaced in the cylinders upon every movement of the steering wheel, thereby producing a resistance that prevents the free castering of the steering ground wheels that are constantly being urged to advance in a straight line on motor cars, on which much research has been done. Very few vehicles require power steering assistance when traveling in a straight line and it usually is only when making short turns, or parking, or backing up, or when turning the wheels while the vehicle is standing still, that power steering is important, or necessary, especially with the present trend towards wide tires with low air pressures.

One of the primary objects of my invention is to provide complete freedom of the steering wheel and steering shaft from any power steering device during normal driving and so as to avoid interference in any way with the free castering of the front wheels, and so as to obviate any lost motion.

A further object of my invention is to provide an assistor that is normally completely inactive in every way, and which preferably only becomes active when an overload develops on the steering wheel shaft.

A further object of my invention is to provide a ball or roller clutch engaging mechanism that will not engage unless the speed reducing gear of the electric motor is in motion.

Another object is to provide an assistor that will at all times remain disconnected from the steering wheel shaft in the event of a power failure or in the event the assistor becomes inoperative.

A further object is to simplify the construction and reduce the cost of the assistor, while at the same time greatly improving its performance.

Still another object is to reduce the required amount of the torque exerted by speeding up the assistor through the attachment of the same to the steering wheel shaft near the steering wheel gear mechanism, inasmuch as the said shaft in most cases revolves about four times to produce a 60 degree movement to the steering cross shaft.

A further object is to provide a mechanism that will respond instantly and revolve in either direction for steering to the right or left under the full and instant control of the steering wheel when subject to an overload.

Furthermore, because a steering assistor ordinarily is used so briefly, as well as intermittently and infrequently, I have found that the battery drain for the fractional horse power required is insignificant and that, therefore, with the use of the battery on the vehicle as a source of power I am able to dispense with all pumps, compressors, receivers, unloading valves and the other equipment necessary when using air, vacuum or liquid for the source of pressure.

By providing a small worm wheel on the motor shaft that meshes into a large worm wheel mounted on the hub of the transmission case, which large worm wheel when active runs at a maximum speed of only forty revolutions per minute, a speed which is somewhat faster than the speed of a steering wheel, the steering mechanism can be readily operated.

Because of the slow speed of this large worm wheel and because the motor shaft is not up to full speed when the clutches engage, there is no shock during the operation of the device, especially since both the motor switch and the clutch engage in close sequence.

While I have shown my invention in the accompanying drawings as applied for power steering, it is understood that this is just to illustrate one form of the invention, since it is obvious that the device may also be applied for operating other controls that are initiated manually, whether for automotive air craft or other purposes.

My invention will be fully understood by reference to the following drawings, in which, Fig. 1 is a vertical longitudinal section through the center of a steering gear mechanism to which my invention is applied;

Fig. 2 is a cross section taken on line 2—2 of Fig. 1, looking in the direction of the arrows;

Fig. 3 is a vertical section taken on line 3—3 of Fig. 1;

Fig. 4 is a horizontal section taken on line 4—4 of Fig. 3;

Fig. 5 is a vertical section taken on line 5—5 of Fig. 3;

Fig. 6 is a horizontal section taken on line 6—6 of Fig. 3;

Fig. 7 is a diagram of the wire connections between the motor and the reversing switches;

Fig. 8 is a diagram showing the clutch action for steering to the right;

Fig. 9 is a diagram showing the clutch position for normal driving without overload on the steering wheel;

Fig. 10 is a diagram showing the clutch action for steering to the left;

Fig. 11 is a diagrammatic view showing the position of the ball clutch for steering to the right;

Fig. 12 is a diagrammatic view showing the position of the ball clutch when being held free from action;

Fig. 13 is a diagrammatic view showing the position of the ball clutch for steering to the left; and Fig. 14 is a diagrammatic view showing the position of the ball clutch when being held free from action.

Referring to the drawings, it will be noted that in the event of a power failure all the clutches are free to move with the steering gear in either direction. Also, when no overload exists on the steering wheel all of the ball clutches remain disconnected from the worm wheel in either direction.

In the drawings, I have shown a transmission casing 2 enclosing a steering gear worm 3 splined on a stub shaft 4.

The worm 3 operates a cross shaft 5 of the usual type, by means of a bifurcated arm 5a carrying an antifriction wheel 5b meshing with the worm 3. The steering gear worm 3 is mounted in taper bearings 6 and 6a, which also act as a support for the stub shaft 4.

The casing 2 is provided with an internal hub 7 adapted to receive a ball bearing 8. The outer race of the ball bearing 8 supports a hub 9 of a worm wheel 10 and is held in position by a retainer ring 11 in the hub 9.

The worm wheel 10 meshes with a worm 12 formed integrally on a shaft 13 which is mounted in ball bearings 14 and 15 in the casing 2.

The outer end of the shaft 12 is splined to receive a motor drive shaft 16 of a reversible motor 17 (see Fig. 2).

The inner surface 18 of the worm wheel 10 is grooved to retain locking ball clutches in tapered recesses 19 as follows: These locking ball clutches are six in number. Three of them, 20, 21 and 22, are for engaging when motion is desired for a right turn, and the three other ball clutches, 23, 24 and 25, are for engaging when motion is desired for a left turn. The tapered recesses 19 for the different ball clutches are located in a member 26, which is splined to the shaft 4 at 27 and held in locked position by a split ring 28 against which the member is clamped by the worm 3.

The split ring 28 fits into a groove 29 between the splines 27 and splines 30 and is kept in position by a hub extension 31 on the member 26.

The member 26 also has a hub extension 32, which is provided with a retainer ball race 33 to receive balls 34. The balls 34 also support an arm-carrying member 35 having a flange 36.

The flange 36 supports rigidly three arms 37, 38 and 39 for controlling the motion thereof to the right and arms 40, 41 and 42 for controlling the clutches for engagement for motion to the left (see Fig. 2).

The normal position, without overload on the steering wheel shaft 5, of the arms 37, 38, 39, 40, 41 and 42 is to prevent any of the ball clutches 20, 21, 22, 23, 24 and 25 from engaging the inner surface 18 of the worm wheel 10 against the tension of springs 43 in the member 26 so that the mechanism between the steering wheel shaft 5 and the worm wheel 10 is normally disengaged from the worm wheel 10, the worm 12 and the motor 17, during which time the motor 17 is also inactive.

Referring more particularly to Fig. 2, when an overload develops on the steering wheel shaft 5 and assistance is desired, a difference in motion described hereinafter is developed and the arms 37, 38 and 39 move for engaging motion to the right, and to release the balls 20, 21 and 22 into clutch engagement with the surface 18 on the worm wheel 10 by the action of the springs 43, because of the inclined surfaces 19 and the surface 18 on the worm wheel 10.

During the movement of the arms 37, 38 and 39 to the right the arms 40, 41 and 42 will further compress the springs 43 by moving the clutch balls 23, 24 and 25 against the springs 43.

This is necessary because of the need to keep the assistor disengaged in normal operation when the assistor is not needed and also to keep the assistor disengaged for either motion to the right or left when the assistor becomes inoperative for any reason, which otherwise would lock the worm wheel 10 with the worm 12, but still permit the steering wheel and shaft 5 to operate without the assistor, a most important feature.

The control of the mechanism previously described is accomplished by a steering wheel shaft 44, having a splined extension 45 and a reduced end pilot bearing 46 operating in a needle bearing 47, which is mounted in an end 48 of the stub shaft 4 (see Fig. 1). A lost motion coupling sleeve member 49 is mounted on the splines 30 and is kept in engagement with a cylindrical lost motion coupling member 50 by a spring 51 bearing against the sleeve member 49 and the member 26 (see Fig. 1).

Rotary motion in either direction of the cylindrical member 50, by reason of the spline 45 is conducted to the flange 36 by pins 52 riveted into the flange 36 and slidable in engaging arms 53, 54 and 55. The result of this is that motion in either direction of the steering wheel shaft 44 is transmitted directly to the flange 36 and the arms 37, 38, 39, 40, 41 and 42 for the purpose hereinbefore described.

The lost motion coupling members 49 and 50 are also kept in normal contact in motion in either direction by the action of the spring 51 bearing against the tapered jaw clutches 56 on the member 50 and corresponding recesses 57 on the member 49.

The recess 57 on the member 49 is wider than the tapered jaw clutch 56 on the member 50 so that because of the inclined surface of the tapered jaw clutch 56 bearing against a similar taper in the recess 57 on the member 49, these inclined surfaces will, when overloaded, force the two members 49 and 50 apart against the spring 51 and cause a differential of motion between the members 49 and 50 but not between the member 50 and the flange 36.

The action of the differential motion between the members 49 and 50 is shown in Figs. 8, 9 and 10, wherein Fig. 8 shows the relative position of the two members for a right turn, Fig. 9 shows the normal positioning or without assistor position, and Fig. 10 shows the relative position of the two members for a left turn of the steering wheel shaft 44.

For controlling the electric circuit to the motor 17, the sleeve member 49 is provided with an arm 60, which arm 60 is provided with a riveted extension pin 61 at its outer end.

The pin 61 engages a slot 62 of a non-conducting fibre block 63 slidable on a guide shaft 64.

The guide shaft 64 is mounted in a composite fibre block, provided with end portions 65 and 66, that is held rigidly to the member 50 by rivets 67 and 68 (see Figs. 3 and 5). The block end portion 65 is also provided with electric contact pins C, D and the block end portion 66 is provided with electric contact pins A, B.

The two block portions 65 and 66 are connected by a bar-like side portion 70.

The slidable block 63 is, furthermore, provided with a plunger 71 having a flange 72 and a guide extension 73, and the flange 72 is held against a stop 74 by a spring 75 which bears against the flange 72 and a screwed in plug 76.

When the block 63 is moved so that the plunger 71 contacts the pins C, D this circuit will be closed for left turn because the block 63 is held stationary by the pin 61 on the arm 60 while the member 50 turns anti-clockwise and contacts the pins C and D.

A similar plunger 77 is provided in the fibre block 63 on the opposite side. The plunger 77 has a flange 78 and a guide extension pin 79. The flange 78 is held against a stop 80 by a spring 81 which bears against the flange 78 and a screwed in plug 82.

Thus, when the steering wheel shaft 44 is moved clockwise because of overload to the right, the block 63 being held by the pin 61 on the arm 60, the plunger 77 will close the electric contact pins A and B when the plunger 77 comes in contact.

Having described the making and breaking electric circuit, I will now describe the circuit leading from this point to the reversible electric motor 17.

An annular non-conducting fibre sleeve 90 is fitted over the member 50 and held in position thereon by screws 91.

The sleeve 90 is provided with four annular conductor rings which are referenced with the letters A', B', C' and D'. The pin C is connected to the annular ring C' and the pin D is connected to the annular ring D'. Likewise, the pin A is connected to the annular ring A' and the pin B is connected to the annular ring B'.

The connection may be made in various ways, but I have shown a preferred way of accomplishing this in Fig. 6, in which a hole 92 is drilled into the rim of the sleeve 90 below the conductor rings in a manner to contact the particular conductor ring D' at the top, in Fig. 6, and the conductor ring C' at the bottom, both preferably with silver solder. The wire ends are brought up between the sleeve 90 and a collar 93 and secured around four screws 94, respectively, to which are also secured the wire ends, respectively, from the switch contacts A, B, C and D.

In order to conduct the current when the circuit is closed from the annular rings A', B', C' and D' I provide carbon plungers 95, each having an enlarged portion 96 to bear against a stop 97 when fully extended.

Each of the carbon plungers 95 has a spring 98 which keeps the carbon plunger 95 in contact with its particular annular ring. Each plunger 95, 96, with its spring 98, is enclosed in a cylindrical holder 99 and the holders 99 are secured in a removable plate 100. Each holder 99 is properly insulated from the plate 100 by an insulating sleeve 100a and is held in place by a threaded nut 100b which draws the holder 99 against a flange 101 thereon and also secures in place the wires from the respective terminals.

A plug 102 screwed into the top of each holder 99 holds the spring 98 compressed against the plunger 96.

All of the holders for the four carbon brushes are alike and serve to pick up the current from the annular rings, regardless of the position of the switch block 63, which revolves with the steering wheel shaft 44.

The wires on the reverse motor 16 are shown as connected to terminals A'', B'' for the right turn and to terminals C'', D'' for the left turn. This, of course, depends on the direction of the worm pitch 12, which in the drawing is provided with a right hand thread. It is a matter of merely reversing the wires, as shown in Fig. 7, to reverse the motor, to cause it to respond in the proper rotation with the steering wheel shaft.

In order to relieve the end thrust of the spring 51 against the members 49 and 50 I provide a thrust bearing 110 for the member 50 and a ring 111 which in turn bears against a wall 112 of a side casing 113 secured to the casing 2 by screws 114.

An annular ball bearing 115 is provided in a hub 116 of the casing 113 for supporting the steering shaft 44.

The steering shaft 44 is held in position, furthermore, by a split ring 117, which fits into a groove 118 in the shaft 44. The split ring 118 is held in place by the ring 111.

A cap 119 secured by bolts 120 holds the bearing 115 in position and also provides an anchor for a steering post tube 121 and a packing ring 122.

In practice the mechanism described can be more compact, but is drawn somewhat diagrammatically and somewhat enlarged for clarity herein.

In the operation, when turning the steering wheel to turn the steering wheel shaft 44 clockwise to the right, at the upper portion of Fig. 2, the circuit is closed between the contact points A and B, causing the motor 17 to start up to turn the worm wheel 10 clockwise in Fig. 2.

At the same time the arms 37, 38 and 39 will move into the position shown in Fig. 11 and instantly permit the engagement of the clutch balls 20, 21 and 22 to engage the surfaces 18 and 19, and lock the member 26 to the worm wheel 10. This action does not take place in the form of a shock because first the degree of movement of the arms 37, 38 and 39 permits a slipping action and secondly this locking action takes place almost simultaneously with the starting of the motor which will also hesitate slightly when it picks up the load. Since the preferred speed of the worm wheel 10 is only 40 revolutions per minute, no substantial shock can possibly occur through the action of the ball clutches. The member 26 being splined to the stub shaft 4 through the spline 28, the electric assistor adds to the power exerted manually and is instantly disconnected when the assistor power over-runs the motion of the manual steering wheel and steering shaft 44.

When the motion to the right by the steering shaft 44 ceases, the contacts between A and B will be broken and the arms 37, 38 and 39 will again be moved to the normal inactive position shown in Fig. 2, in which all the clutch balls are disengaged.

During the active period just described the clutch balls 23, 24 and 25 will be in the position shown in Fig. 12.

When the steering wheel and shaft 44 are moved counterclockwise or towards the left the contact points C, D are closed, which will start up the motor 16 in reverse direction to the right hand steering and the arms 40, 41 and 42 will be in the position shown in Fig. 13, thereby locking the clutch balls 23, 24 and 25 to the worm wheel 10 and the member 26 because of the wedge action between the surfaces 18 and 19 and the springs 43. During this period the arms 37, 38 and 39 will be in the position shown in Fig. 14 and the motor 16, having started in reverse direction, now assists the manual effort on the hand steering wheel and steering shaft 44 until the effort on the steering wheel stops when the spring 51 will again bring the clutch members 56, 57 on the members 49, 50 into the position shown in Fig. 9 and open the circuit between the contact pins C and D and stop the motor 17.

While I have described my invention above in detail I wish it to be understood that many changes may be made therein without departing from the spirit of the same. For instance, I can use, instead of the reversible electric motor 17, any other type of electrically driven motor with appropriate connections for driving the gearing forwardly or in the reverse direction, as desired.

I claim:

1. A manually controlled electric power assistor, comprising a manually controlled shaft, an output shaft, a lost motion coupling having relatively movable members, one of said members being secured to the manually controlled shaft and another of said members being slidably connected to said output shaft, yielding means tending to prevent relative movement of said two members, a normally disengaged clutch, having means for engaging the clutch, connected to said manually controlled shaft, said clutch having one clutch member secured to said output shaft and the other clutch member having a reducing gear connected to a reversible electric motor, and an electrical connection for energizing said motor including a switch having a contact connected to the lost motion coupling so as to be movable into closed position by said lost motion coupling when the manually controlled shaft is moved.

2. A manually controlled electric power assistor, comprising a manually controlled shaft, a power output shaft, a lost motion coupling having relatively movable members, one of said members being secured to the manually controlled shaft and the other of said members being slidably connected to said power output shaft, a spring tending to prevent relative movement of said two members, a normally disconnected clutch, having means for engaging the clutch, connected to said manually controlled shaft, said clutch having one clutch member secured to said power output shaft and the other clutch member having a reducing gear connected to a reversible electric motor, an electric circuit for energizing said electric motor and a switch having a contact connected to the lost motion coupling for closing said circuit, and said switch having a contact connected to one of said lost motion coupling members so as to be movable by said manually controlled shaft.

3. A manually controlled electric power assistor, comprising a manually controlled shaft, a power output shaft, a lost motion coupling having relatively movable members, one of said members being secured to the manually controlled shaft and the other of said members being slidably connected to said power output shaft, yielding means tending to hold said two members together, a normally disconnected clutch having one clutch member secured to said power output shaft and the other clutch member having a reducing gear connected to a reversible electric motor, an electric circuit for energizing said motor and a switch for closing said circuit, said clutch having means for engaging the clutch, connected to the manually controlled shaft and said switch having a connection to one of said lost motion coupling members so as to movable by said manually controlled shaft.

4. A manually controlled electric power assistor, comprising a manually controll shaft, a power output shaft, a lost motion coupling having relatively movable members, one of said members being secured to the manually controlled shaft and the other of said members being slidably connected to said power output shaft, a spring tending to hold said two members together, a normally disengaged clutch having one clutch member secured to said power output shaft and the other member having a speed reducing gear leading to a reversible electric motor, and an electric circuit for energizing said motor including a switch having a connection to one of said lost motion coupling members so as to be movable by said manually controlled shaft.

5. A manually controlled electric power assistor, comprising a manually controlled shaft, a power output shaft, a lost motion coupling having relatively movable members, one of said members being secured to the manually controlled shaft and the other of said members being slidably connected to said power output shaft, yielding means tending to hold said two members together, a normally disengaged clutch having means for engaging the clutch, connected to said manually controlled shaft, having one clutch member secured to said power output shaft and the other clutch member having a reducing gear connected to a reversible electric motor, and an electric circuit including a switch having a contact connected to one of said lost motion coupling members for operating said electric motor by the differential movement of the lost motion coupling by the movement of said manually controlled shaft.

6. A manually controlled electric power assistor, comprising a manually controlled shaft, a power output shaft, a lost motion coupling having relatively movable members, one of said members being secured to the manually controlled shaft and another of said members being connected to said output shaft, a spring tending to hold said two members together, a normally inactive clutch having means for engaging the clutch, connected to said manually controlled shaft, said clutch having a clutch member secured to said power output shaft, and a speed reducing gear for connecting the clutch to a source of power input.

7. A manually controlled electric power assistor, comprising a manually controlled shaft, a power output shaft, a lost motion coupling having relatively movable members, one of said members being secured to the manually controlled shaft and the other of said members being connected to said power output shaft, yielding means tending to prevent relative movement of said two members, a normally inactive clutch having means for engaging the clutch, connected to said manually controlled shaft, said clutch having a clutch member secured to said power output shaft, a speed reducing gear for connecting the clutch to a source of electrical power input, and a switch mechanism for said source of electrical power input having a contact connected to one of said coupling members so as to moved by the relative movement of said coupling.

8. A manually controlled electric power steering assistor for motor vehicles, comprising a manually controlled steering shaft, a worm wheel shaft, a clutch having two members, one member being connected to the worm wheel shaft and the other member being connectable to a speed reducing gear for a reversible electric motor, locking means between said two clutch members, electrical connections for said reversible electric motor, including a switch, and a two-member lost motion coupling having connections to said switch and said locking means for said clutch, one of said lost motion coupling members being mounted on said steering shaft and the other member being slidably connected with the worm wheel shaft.

9. A manually controlled electric power assistor, comprising a manually controlled shaft, a power output shaft, a normally disengaged clutch having one member being connected with said power output shaft and the other member being connectable to a speed reducing gear for a reversible electric motor, means for locking said two clutch members together, a plurality of insulated annular electric contact rings connected to move with the manually controlled shaft, stationary brushes connecting said electric motor with said insulated contact rings, an electric circuit for energizing the said motor, an electric switch in said circuit and connected to said rings for closing said circuit, and a two-member lost motion coupling connected to said switch and said locking means for said clutch member, one member of said lost motion coupling being mounted on the manually controlled shaft and the other member being connected with the power output shaft.

10. A manually controlled electric power assistor, comprising a manually controlled shaft, a power output shaft, a speed reducing gear for a reversible electric motor, a single double acting clutch having spring-pressed automatically releasable locking balls connecting said manually controlled shaft with said reversible electric motor, a plurality of insulated annular contact rings connected to move with the manually controlled shaft, two sets of stationary brushes connecting said electric motor with said insulated annular contact rings, an electric circuit for energizing the said motor to be driven in forward or reverse from either of said two sets of brushes according to the position of the manually controlled shaft, an electric switch in said circuit and connected to said rings for closing said electric circuit, and a two-member lost motion coupling for closing said switch to apply power to the output shaft through said clutch when said motor is operative but so as to release said clutch when said electric motor stalls.

11. A manually controlled electric power assistor, including a power output shaft, a speed reducing gear for a rotatable electric motor to drive said shaft having a coupling connected to the power output shaft, a manually controlled shaft, a clutch having spring-pressed automatically releasable locking balls connecting said electric motor with said power output shaft when said motor is operative but so as to release said electric motor when said electric motor stalls, an electric circuit for energizing said electric motor including a switch, and means connected with said manually controlled shaft for closing said electric switch to drive the motor by closing said switch and render said clutch operative.

12. A manually controlled electric power assistor, comprising a manually controlled shaft, a power output shaft connected to the manually controlled shaft, connections for a reversible electric motor, a single double acting automatically releasable clutch connecting said power output shaft with said reversible electric motor connections, insulated annular contact rings connected to move with the manually controlled shaft, stationary brushes connecting said electric motor with said insulated annular contact rings, an electric circuit for energizing the said motor, an electric switch in said circuit and connected to said rings for closing said electric circuit, a two member lost motion coupling which connects the manually controlled shaft to the power output shaft including a limit stop for closing said switch to apply power to the output shaft through said clutch when said motor is operative but so as to release said clutch when said electric motor stalls.

13. A manually controlled electric power assistor, including a power output shaft, connections for an intermittently operable reversible electric motor to drive said shaft, a manually controlled shaft having a coupling connected to the power output shaft, a clutch having spring-pressed automatically releasable locking balls for connecting said electric motor with said power output shaft when said motor is operating but so as to release said electric motor when said electric motor stalls, an electric circuit for energizing said electric motor including a switch, and means connected with said manually controlled shaft for closing said electric switch to drive the motor by closing said switch and render said clutch operative.

14. A manually controlled electric power assistor comprising a manually controlled shaft, a power output shaft connected to the manually controlled shaft, a speed reducing gear for a reversible electric motor, a single clutch having a ball clutch engaging mechanism connecting said power output shaft with said speed reducing gear, a two member lost motion coupling, one member being secured to the power output shaft, and the other member to the manual control shaft, said ball clutch engaging mechanism having a connection operated by said lost motion coupling to engage said clutch only when said speed reducing gear is in motion.

15. In an electric power steering assistor for motor vehicles, a manually operable steering shaft, a manual and power output shaft connected to the first mentioned shaft, a single normally released clutch requiring assistor follow-up power to engage the same, connections for an intermittently operable reversible electric motor for driving said output shaft in either direction through said manual and power clutch, an electric switch mechanism connected to energize said electric motor, a lost motion coupling, one member of said coupling being connected to said manually operable steering shaft for engaging said clutch and the other member being connected to the manual and power output shaft, and cooperating with said electric switch to operate said electric motor when assistor power is required, and a spring for holding said two members of said coupling in inactive position for normal manual steering when the power is not required.

16. An electric power steering assistor comprising, a manually operable steering shaft, a manual and power output shaft, connections for an intermittently operable reversible electric motor with said manual and power output shaft including a clutch, a plurality of electric switches for controlling said intermittently operable reversible electric motor including an electric wire circuit, a lost motion coupling connecting said manually operable steering shaft with said manual power output shaft, and means associated with said lost motion coupling for operating said switches and said clutch by different motions of said steering shaft.

EDWIN G. STAUDE.

REFERENCES CITED

The following references are of record in the file of this patent:

UNITED STATES PATENTS

| Number | Name | Date |
|---|---|---|
| 1,122,794 | Nelson | Dec. 29, 1914 |
| 2,311,010 | Vickers | Feb. 16, 1943 |